(12) United States Patent
Sugita

(10) Patent No.: US 12,284,323 B2
(45) Date of Patent: Apr. 22, 2025

(54) IMAGE PROCESSING APPARATUS THAT COMMUNICATES WITH A CHAT SERVICE, STORAGE MEDIUM, AND METHOD OF CONTROLLING THE SAME

(71) Applicant: CANON KABUSHIKI KAISHA, Tokyo (JP)

(72) Inventor: Hikaru Sugita, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/052,500

(22) Filed: Nov. 3, 2022

(65) Prior Publication Data

US 2023/0146878 A1 May 11, 2023

(30) Foreign Application Priority Data

Nov. 9, 2021 (JP) ................................. 2021-182335

(51) Int. Cl.
*H04N 1/00* (2006.01)
*H04N 1/32* (2006.01)
*H04N 1/42* (2006.01)

(52) U.S. Cl.
CPC .......... *H04N 1/42* (2013.01); *H04N 1/00212* (2013.01); *H04N 1/0022* (2013.01); *H04N 1/00233* (2013.01); *H04N 1/00244* (2013.01); *H04N 1/32106* (2013.01); *H04N 1/32358* (2013.01); *H04N 2201/0094* (2013.01); *H04N 2201/3218* (2013.01)

(58) Field of Classification Search
CPC .... H04N 1/42; H04N 1/00212; H04N 1/0022; H04N 1/00233; H04N 1/00244; H04N 1/32106; H04N 1/32358; H04N 2201/0094; H04N 2201/3218
USPC ......................................................... 358/407
See application file for complete search history.

(56) References Cited

U.S. PATENT DOCUMENTS

| 2016/0050326 | A1* | 2/2016 | Lee | H04N 21/64322 358/402 |
| 2019/0369924 | A1* | 12/2019 | Oka | H04L 51/02 |
| 2021/0099608 | A1* | 4/2021 | Kamihisa | H04N 1/32769 |
| 2021/0120144 | A1* | 4/2021 | Takahashi | H04N 1/32128 |
| 2023/0059572 | A1* | 2/2023 | Yamamoto | H04N 1/32432 |

FOREIGN PATENT DOCUMENTS

JP 2003219078 A 7/2003

* cited by examiner

*Primary Examiner* — Kent Yip
(74) *Attorney, Agent, or Firm* — Canon U.S.A., Inc. IP Division

(57) ABSTRACT

A method of controlling an image processing apparatus that communicates with a chat service includes storing information on a transmission source of image data and a talk room in the chat service in association with each other, receiving image data, transferring the received image data to a stored transfer destination in association with the information on the transmission source of the image data, and notifying the talk room, stored in association with the information on the transmission source of the image data, that the image data has been received.

16 Claims, 13 Drawing Sheets

FIG. 7

| ID | TRANSMISSION SOURCE NUMBER | TRANSFER DESTINATION | NOTIFICATION DESTINATION | FILE NAME | FILE FORMAT | THUMBNAIL |
|---|---|---|---|---|---|---|
| 1 | 11112222 | aaa@bb.cc | | | PDF | |
| 2 | 22223333 | SERVER A | http://hook.businesschat.com/channel1 | | TIFF | OFF |
| 3 | 44445555 | SERVER B | http://hook.businesschat.com/UserA | test | JPEG | ON |

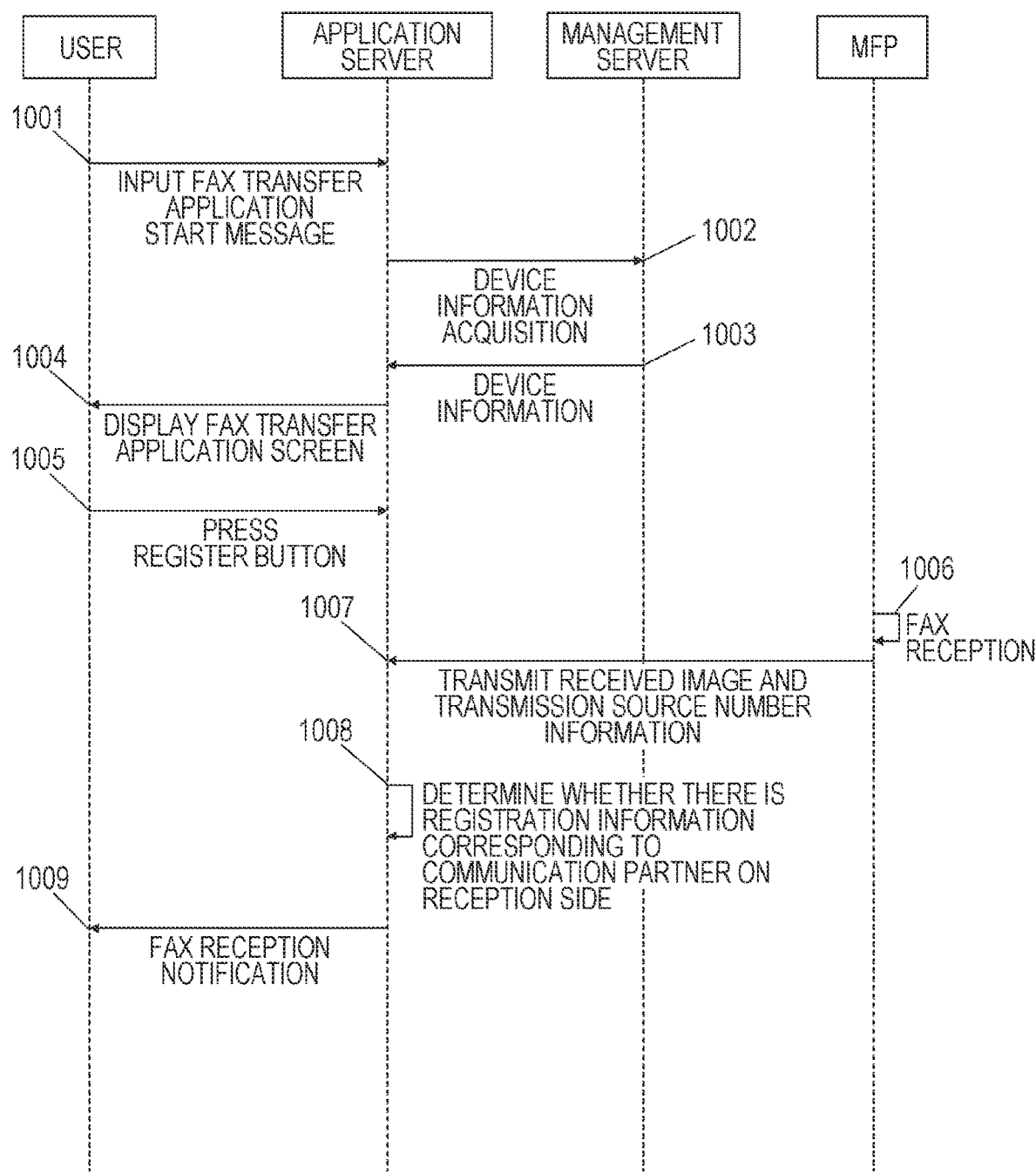

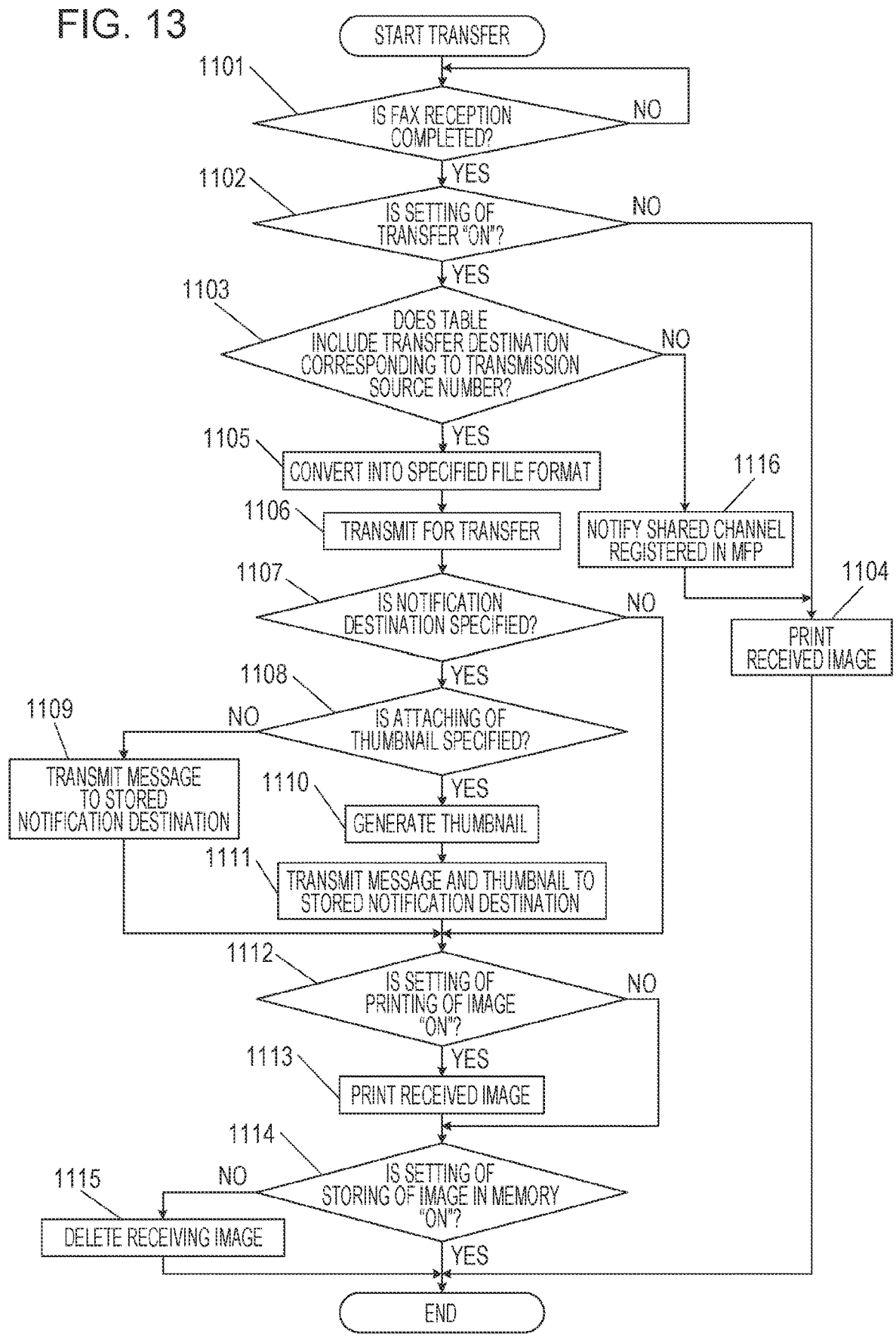

IMAGE PROCESSING APPARATUS THAT COMMUNICATES WITH A CHAT SERVICE, STORAGE MEDIUM, AND METHOD OF CONTROLLING THE SAME

BACKGROUND

Field

The present disclosure relates to an image processing apparatus, a storage medium, and a method of controlling the image processing apparatus.

Description of the Related Art

In recent years, with the spread of cloud computing, it has become increasingly common for data and services to be operated on the cloud, and users can edit the data and receive services without relying on client terminals. Various services and applications are available on the cloud. For example, chat services such as business chat and applications similar thereto are available. These applications enable creation of a location (a channel) where messages, tools, and files are shared by a team and users of the team can exchange messages or files with each other.

The business chat services support cooperation with other cloud services or applications, and provide services where inputting is responded in an interactive manner (hereinafter, this type of service will be referred to as a "bot"). By installing a cooperative application in the business chat, it becomes possible to use the cooperative application on the business chat.

There is known an image processing apparatus capable of transferring an image received by facsimile to a server (see Japanese Patent Laid-Open No. 2003-219078).

A chat service can be used for a user to know that the image processing apparatus has received image data.

The chat service has one or more talk rooms. If notifications of the reception of image data are sent to all users registered in the chat service, the users will be bothered by distinguishing important notifications from non-relevant ones.

SUMMARY

According to an aspect, the present disclosure provides an image processing apparatus that communicates with a chat service, the image processing apparatus including a storage unit configured to store information on a transmission source of image data and a talk room in the chat service in association with each other, a reception unit configured to receive image data, a transfer unit configured to transfer the received image data to a transfer destination stored in the storage unit in association with information on the transmission source of the image data, and a notification configured to notify the talk room, stored in the storage unit in association with information on the transmission source of the image data, that the image data has been received.

Further features of the present disclosure will become apparent from the following description of exemplary embodiments with reference to the attached drawings.

BRIEF DESCRIPTION OF THE DRAWINGS

FIG. 7 is a diagram illustrating a transfer setting stored in an MFP according to an embodiment.

FIG. 12 is a sequence diagram illustrating a flow of processing according to the second embodiment.

FIG. 13 is a flowchart illustrating a transfer process according to a third embodiment.

DESCRIPTION OF THE EMBODIMENTS

Embodiments of the present disclosure are described in detail below with reference to the drawings.

In the embodiments described below, an information processing apparatus is assumed to be, by way of example, Multi-Function Peripheral (MFP) having a print function, a scan function, and a facsimile (FAX) function.

The embodiments are described by way of example only and these embodiments do not limit the scope of the present disclosure. All parts, elements, or steps described in the embodiments are not necessarily needed to practice the disclosure.

A first embodiment of the present disclosure will now be described.

Figure 1:
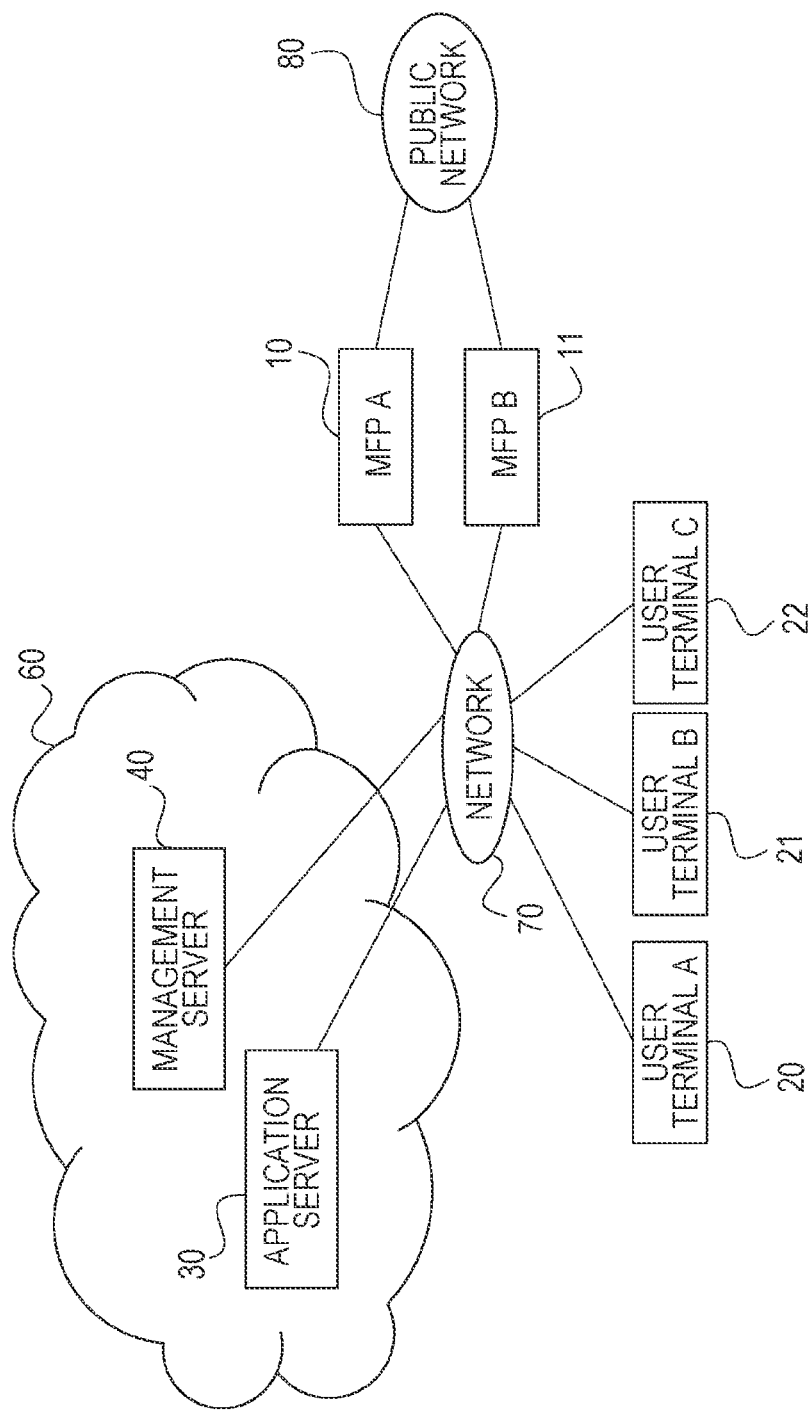
FIG. 1 is a diagram illustrating a system configuration according to an embodiment.

FIG. 1 is a diagram illustrating an example of an overall configuration of a system according to the present disclosure. A message application service includes MFP A 10 and MFP B 11, which are each an image processing apparatus, user terminal A 20, user terminal B 21, and user terminal C 22, an application server 30, and a management server 40. Each of these components are connected to each other via a network 70 such that they can communicate with each other. The network 70 is a wireless or wired network configured by a WAN or a LAN. The message application is one of several applications stored in the application server 30. The MFP A 10 and MFP B 11 can perform FAX transmission and reception via a public line network 80.

The MFP A 10 and MFP B 11 each have a FAX transmission/reception function. Each MFP includes a function of printing an image notified by a message application of the application server 30, a function of notifying a message application server of a read image or an image received by FAX, and a message notification function. In the example illustrated in FIG. 1, MFP 10 10 and MFP B 11 are connected via the network, however, there is not limitation on the number of MFPs that can be connected. MFP A 10 and MFP B 11 have the same configuration, and thus, for ease of discussion, the following description will just refer to MFP A 10 unless otherwise indicated.

User terminal A 20, user terminal B 21, and user terminal C 22 are information terminals such as smartphones, tablets, personal computers, or the like used by a user of the message application service. In the example illustrated FIG. 1, user terminal A 20, user terminal B 21, and user terminal C 23 are connected via the network. However, there is no limitation on the number of user terminals that can be connected. A user operates one or more of user terminal 20, user terminal 21, or user terminal 22 to access a message application of the application server 30 on the cloud, and exchanges messages with other users or executes an installed application. User terminal 20, user terminal 21, and user terminal 22 and the application server 30 are connected to each other via a wired or wireless communication network, and each of the user terminals can transmit and receive data. In the present embodiment, a public network on the Internet is used as a communication network. In another exemplary embodiment, a private network can be used.

User terminal 20, user terminal 21, and user terminal 22 can all have the same configuration, and thus, for ease of discussion, the following description will just refer to user terminal 20 unless otherwise indicated.

The application server 30 is a cloud server located on the cloud 60, and provides services such as a chat service using a message application 306. The application server 30 executes overall processing related to message exchange, such as transmission/reception processing of messages to/from the user terminal 20, user terminal 21, or user terminal 22 and processing of displaying a screen in the message transmission/reception. The mechanism of exchanging messages by the message application 306 will be described below with reference to FIG. 10.

The management server 40 is a cloud server located on the cloud 60, and provides security-related services such as issuing of access tokens. The management server 40 stores user information, channel information, printer information, application information, file information, and the like. The user information includes information such as a user name, a password, an affiliation, an e-mail address, and the like. When the MFP A 10 sends a notification to the message application 306, it is necessary to acquire an access token from the management server 40 before accessing.

Figure 2:
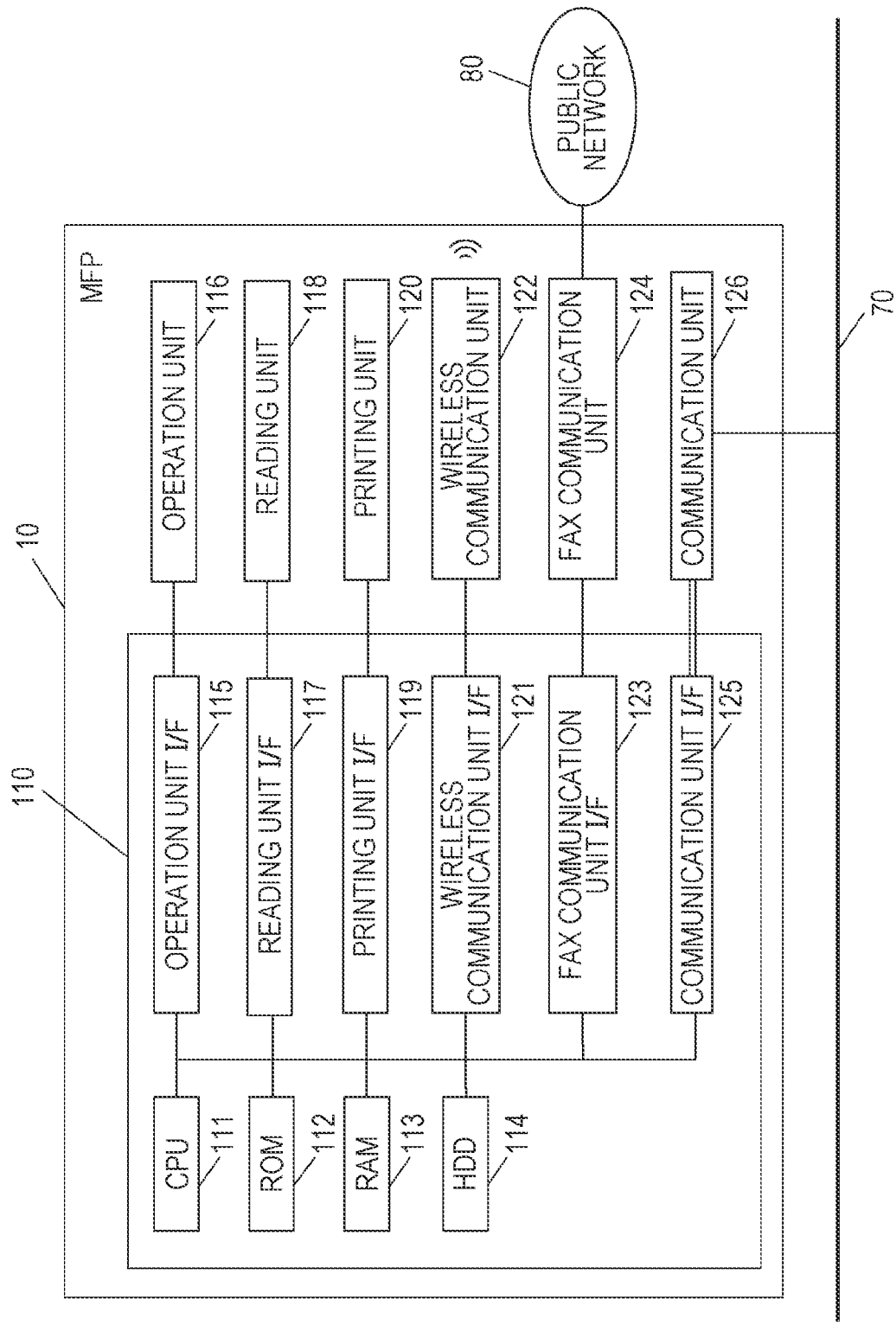
FIG. 2 is a diagram illustrating a configuration of an MFP according to an embodiment.

FIG. 2 is a diagram illustrating an example of a hardware configuration of the MFP 10.

A control unit 110 including a CPU (Central Processing Unit) 111 controls the overall operation of the MFP A 10. The CPU 111 loads control programs from the ROM 112 or the HDD 114 into the RAM 113 and performs various controls including a reading control, a printing control, and the like by executing the control programs.

The ROM (Read Only Memory) 112 stores a control program executable by the CPU 111. The ROM 112 also stores a boot program, font data, and the like.

The RAM (Random Access Memory) 113 is a main storage memory and is used as a work area, a temporary storage area into which various control programs read from the ROM 112 or the Hard Disk Drive (HDD) 114 are loaded.

The HDD 114 stores image data, print data, various programs, various addresses, and various setting information. A storage medium such as a Solid State Drive (SSD), an embedded Multi Media Card (eMMC), or the like can be used instead of the HDD 114.

The present embodiment describes, one CPU 111 in the MFP A 10 executing, using one memory (RAM 113), each process illustrated in flowcharts described below. In another exemplary embodiment, a plurality of CPUs, RAMs, ROMs, and HDDs can execute each process in cooperation with each other. In another exemplary embodiment, part or all of the processes can be executed by a hardware circuit such as an Application Specific Integrated Circuit (ASIC), a Field Programmable Gate Array (FPGA), or the like.

The operation unit I/F (interface) 115 connects an operation unit 116 including a display unit such as a touch panel and/or hard keys to the control unit 110. The operation unit 116 displays information to a user and detects an input from the user.

The reading unit I/F 117 connects a reading unit 118 such as a scanner to the control unit 110. The reading unit 118 reads an image of a document, and the CPU 111 converts the image into image data such as binary data. The image data generated based on the image read by the reading unit 118 is transmitted to an external apparatus or is printed on recording paper.

The printing unit I/F 119 connects the printing unit 120 such as a printer to the control unit 110. The CPU 111 transfers the image data (print data) stored in the RAM 113 to the printing unit 120 via the printing unit I/F 119. The printing unit 120 prints an image based on the transferred image data on recording paper fed from a paper feed cassette.

The wireless communication unit I/F 121 is an I/F for controlling the wireless communication unit 122, and enables the control unit 110 to wirelessly connect to an external device. User terminal 20, user terminal 21, or user terminal 22 can each be used as external wireless devices.

The FAX unit I/F 123 is connected to the public network 80 by controlling the FAX communication unit 124. The FAX unit I/F 123 enables connection to the public network 80 by controlling, for example, a modem and an NCU for facsimile communication, and the facsimile communication protocol, etc.

The communication unit I/F 125 connects the control unit 110 and the network 70. The communication unit I/F 125 communicates with the communication unit 126 to enable transmitting image data and various internal information of the MFP A 10 to an external apparatus on the network 70, and receiving print data and information on the network 70 from an apparatus on the network 70. Transmitting/receiving via the network 70 can be realized by transmission/reception using electronic mail (E-mail) or file transmission using protocols such as File Transfer Protocol (FTP), Server Message Block (SMB), WEBDAV, etc. Transmission/reception of image and various setting data can be achieved by Hyper Text Transfer Protocol (HTTP) communication via the network 70 by accessing the MFP A 10 from the user terminal A 20 or the application server 30.

Figure 3:
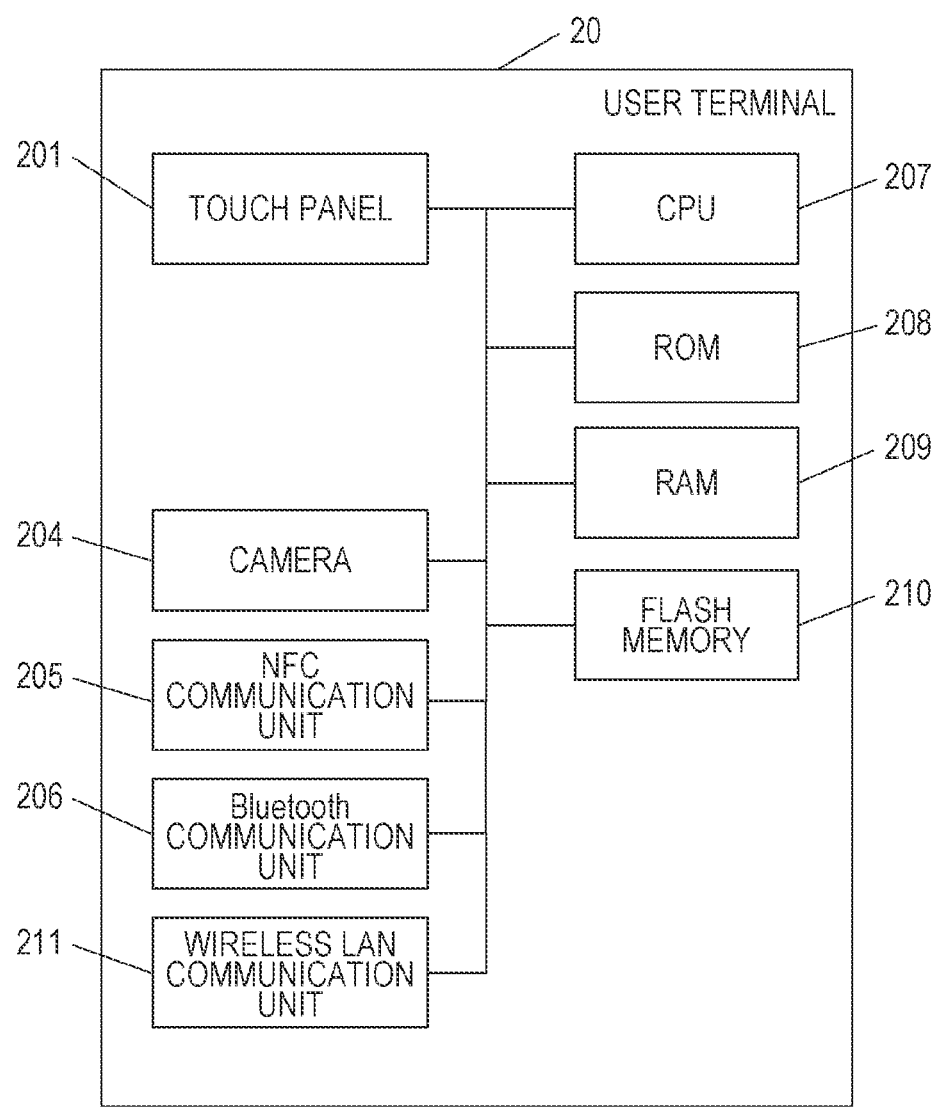
FIG. 3 is a diagram illustrating a configuration of a user terminal according to an embodiment.

FIG. 3 is a diagram illustrating an example of a hardware configuration of the user terminal 20. It is assumed in the present embodiment that the user terminal 20 is a device such as a smartphone, a tablet PC, or the like, but the user terminal 20 can be any other type of information processing apparatus as long as can connect to the network 70 via using Wi-Fi® communication or the like.

The CPU 207 reads control programs stored in the ROM 208 and executes various processes for controlling the operation of the user terminal 20.

The ROM 208 stores control programs.

A RAM 209 is used by the CPU 207 as a main memory and a temporary storage area such as a work area.

A flash memory 210 stores various data such as photographs and electronic documents.

A touch panel 201 can detect a touch operation performed by a user, and displays various screens provided by an OS or an e-mail transmission application. The touch panel 201 is also used to confirm information stored in the application server 30. A user can input a desired operation instruction to the user terminal 20 by performing a touch input operation on the touch panel 201. The user terminal 20 can have hardware keys (not illustrated), which enables the user to use these hardware keys to input operation instructions to the user terminal 20.

A camera 204 captures an image based on an image capture instruction issued by a user. The image captured by the camera 204 is stored in a predetermined area of the flash memory 210. It is also possible to read a QR (Quick Response) Code® by the camera 204 and acquire information from the QR Code® by analyzing it using a program.

The user terminal 20 can exchange data with various peripheral devices via a Near Field Communication (NFC) communication unit 205, a Bluetooth® communication unit 206, or a wireless LAN communication unit 211. The Bluetooth® communication unit 206 of the user terminal 20 can support Bluetooth® Low Energy.

Figure 4:
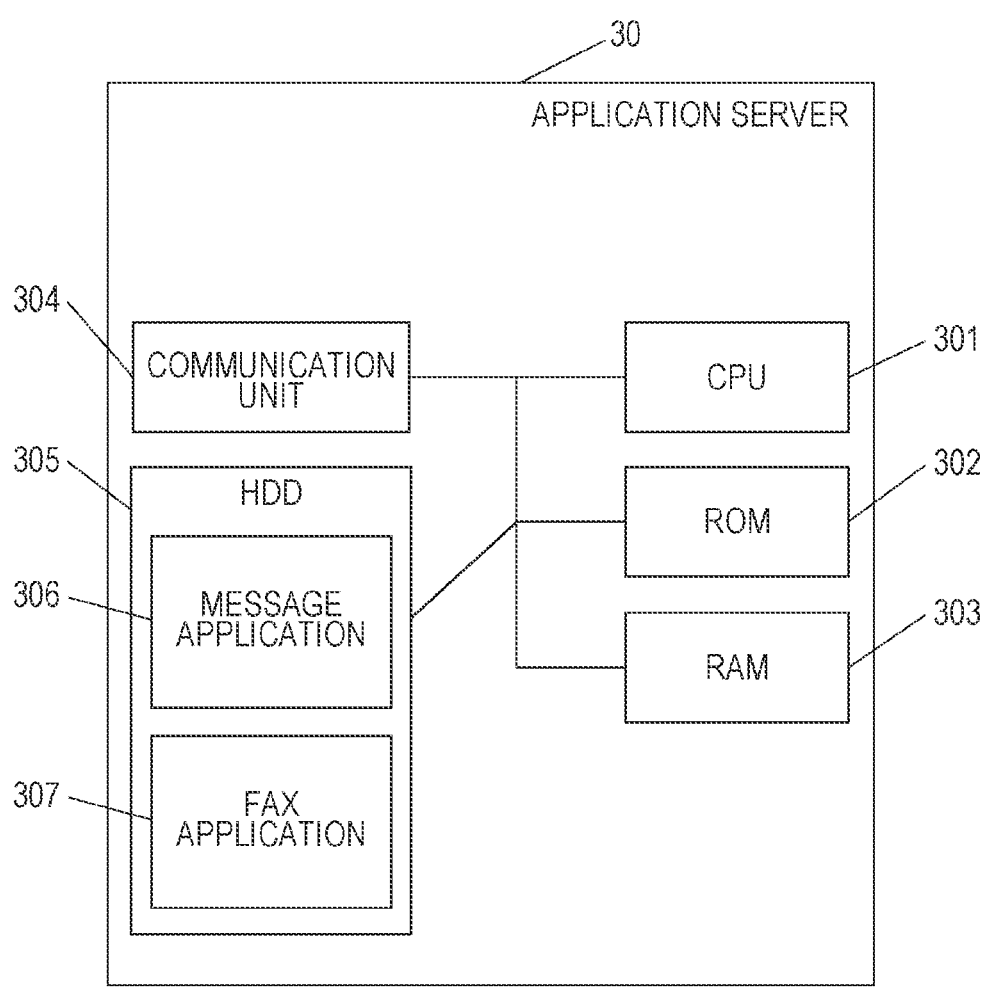
FIG. 4 is a diagram illustrating a configuration of an application server according to an embodiment.

FIG. 4 is a diagram illustrating an example of a hardware configuration of the application server 30. The CPU 301 reads control programs stored in the ROM 302 or reads a message application 306 stored in the HDD 305 and executes various processes for controlling the operation of the message application server 30.

The ROM 302 stores control programs.

A RAM 303 is used as a main memory of the CPU 301 and a temporary storage area such as a work area.

The communication unit 304 is used by the application server 30 to exchange data with various devices such as the user terminal 20, the MFP 10, and the like.

The HDD 305 stores various data such as messages, images, channel information, applications, and/or the like. The communication unit 304 can perform a wired communication using Ethernet®, or can perform a wireless communication such as a Wi-Fi® communication. The message application 306 is installed in the HDD 305 and is executed by the CPU 301. A FAX application 307 is a cooperative application of the message application 306, and can make a registration in terms of to which talk room a FAX reception notification, an image, and/or the like received from the MFP 10 are to be sent, and can execute a related operation.

Figure 5:
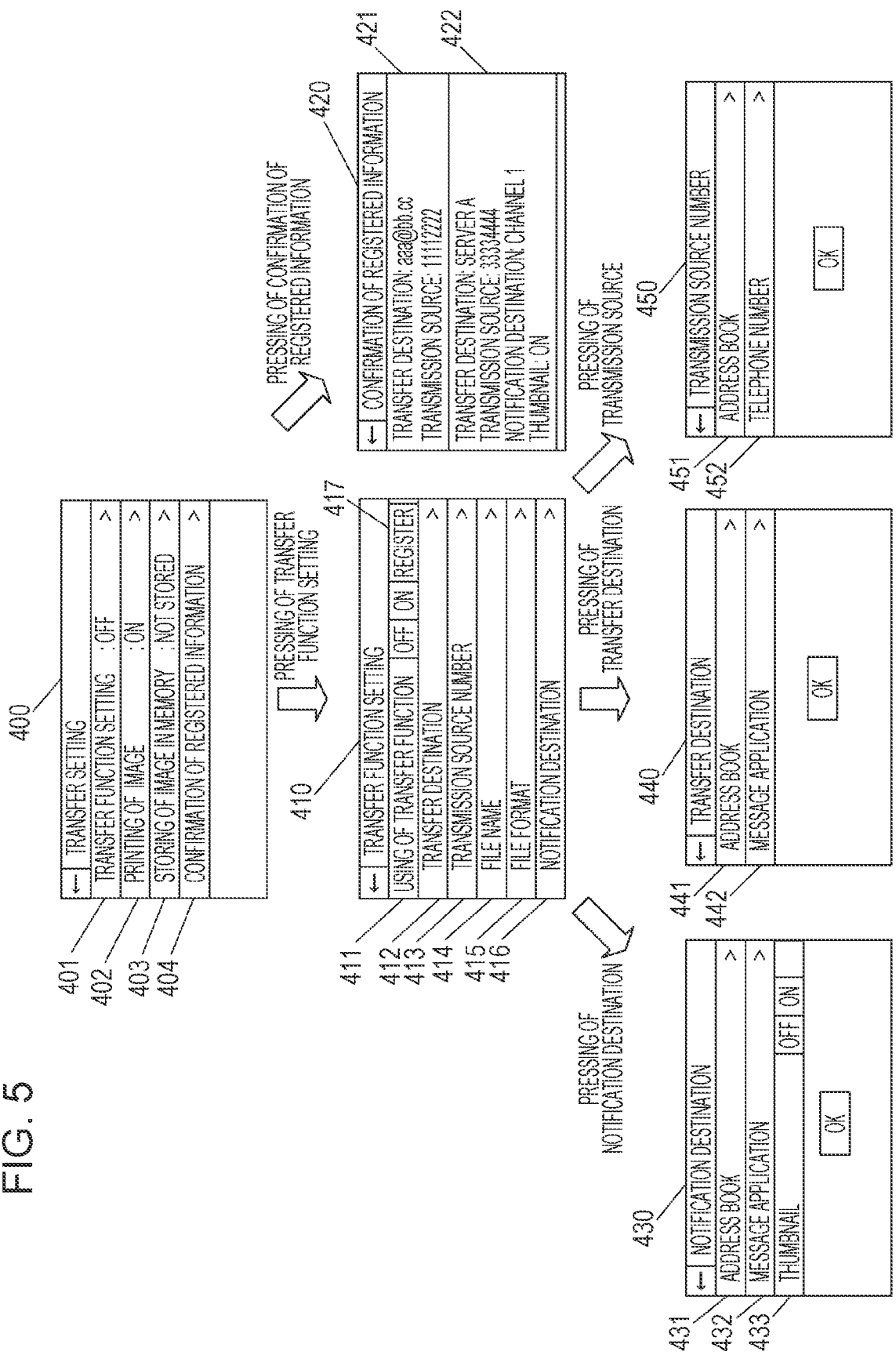
FIG. 5 is a diagram illustrating transfer setting screens on an MFP according to an embodiment.
Figure 6:
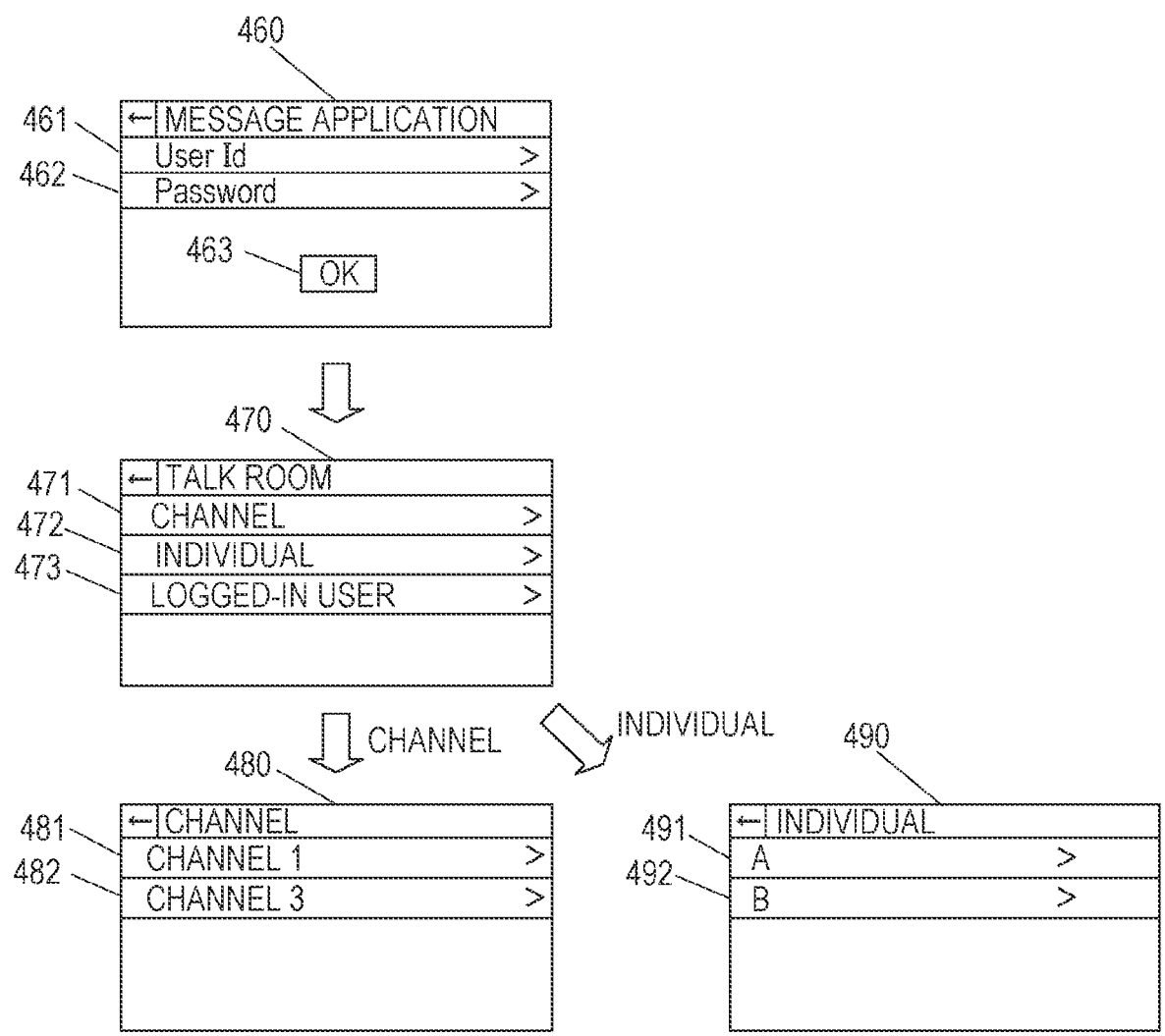
FIG. 6 is a diagram illustrating transfer setting screens on an MFP according to an embodiment.

FIGS. 5 and 6 are diagrams illustrating an example of a flow of FAX transfer setting in which various screens illustrated in FIG. 5 or 6 are displayed on the operation unit 116 of the MFP 10. The transfer setting is used as a transfer condition for determining whether to transfer image data when the MFP 10 receives the image data by FAX. The transfer settings include information indicating a transfer method in terms of a transfer destination to which the image data is to be transferred and a file name and a file format used in the transferring the image data. The transfer setting also includes a notification destination to which a notification of receipt of a FAX is to be sent. That is, it is possible to separately set the transfer destination of image data received by FAX and the notification destination to which to notify that the image data has been received by FAX. For example, image data received by FAX is stored in a file server, and the user can know, on the user terminal, that the FAX has been received. When the user receives the notification, the user can access, via the user terminal, the image data stored in the file server. The transfer destination is not limited to the file server, and the transfer destination can be an e-mail address or the like. In this case, the MFP 10 attaches the image data received by FAX to an e-mail to transfer the image data.

A screen 400 is a transfer setting screen. When "transfer function setting" 401 is selected, a transfer function setting screen 410 is displayed. When "print image" 402 is selected, a screen is displayed for setting, by a user, whether a received image is to be printed. The user sets, via this screen, whether the received image is to be printed. When "storing of image in memory" 403 is selected, a screen is displayed for setting, by the user, whether the received image is to be stored in the MFP 10. The user sets, via this screen, whether the received image is to be stored in the MFP 10. When "confirmation of registered information" 404 is selected, a screen 420 is displayed for confirming the registered information.

A screen 410 is a transfer function setting screen. "Using of transferring function" 411 is an item set by the user as to whether the transfer function is enabled or disabled. When the transfer function is set to be enabled, the transfer setting set via screens illustrated in FIGS. 5 and 6 are enabled, but when the transfer function is set to be disabled, the transfer setting set via screens illustrated in FIGS. 5 and 6 are disabled.

When "transfer destination" 412 is selected, a transfer destination screen 440 is displayed. When "transmission source number" 413 is selected, a transmission source number screen 450 is displayed. When "file name" 414 is selected, a file name setting screen for setting the file name of the image to be transferred is displayed, and the user can set, via this screen, the file name of the image to be transferred. When "file format" 415 is selected, a screen is displayed for setting the file format of the image to be transferred. When "notification destination" 416 is selected, a notification destination screen 430 is displayed. When "register" 417 is selected, the setting contents set via screens illustrated in FIGS. 5 and 6 are registered in the HDD 114.

A screen 420 is for confirming registered information. Sections 421 and 422 denote information on the transfer setting registered in the HDD 114. More specifically, information in section 421 indicates that a FAX image received from telephone number 11112222 is to be transmitted to an e-mail address aaa@bb.cc. Information in section 422 indicates that a FAX image received from telephone number 33334444 is to be transmitted to the server A. A thumbnail image and a notification of receipt of the FAX image are then sent to a talk room of channel 1 of the message application. The thumbnail image is, for example, a thumbnail image obtained as a result of converting a first page of the received FAX image into JPEG format. The transmission of such a thumbnail image enables a user on the message application side to understand what kind of image the MFP 10 has received.

A screen 430 is a notification destination screen. When "address book" 431 is selected, address book information stored in the HDD 114 is displayed. The user selects an address to be set as a notification destination from the displayed address book information. When an address is selected, the CPU 111 sets the selected address as the notification destination. When "message application" 432 is selected, a message application screen 460 is displayed. The message application screen 460 will be described below with reference to FIG. 6. "Thumbnail" 433 is for setting whether a thumbnail image is to be transmitted. When "OK" on the screen 430 is selected, the screen 410 is displayed.

A screen 440 is a transfer destination screen. When "address book" 441 is selected, the address book information stored in the HDD 114 is displayed. The user selects an address to be set as a transfer destination from the displayed address book information. When an address is selected, the CPU 111 sets the selected address as the transfer destination. When "message application" 442 is selected, the message application screen 460 is displayed. When "OK" on the screen 440 is selected, the screen 410 is displayed.

A screen 450 is a transmission source number screen. When "address book" 451 is selected, the address book information stored in the HDD 114 is displayed. The user selects an address to be set as a transmission source from the displayed address book information. When an address is selected, the CPU 111 sets the selected address as the transmission source. When "telephone number" 452 is selected, a screen (not illustrated) is displayed and the user can input, via the operation unit 116, a telephone number to be set as the transmission source. When "OK" on the screen 450 is selected, the screen 410 is displayed.

In FIG. 6, a screen 460 is a message application screen. When "user ID" 461 is selected, a user ID input screen (not illustrated) is displayed, and the user can input a user ID via this user ID input screen. When "password" 462 is selected, a password input screen (not illustrated) is displayed, and the user can input a password via the password input screen. An access token can be obtained from the management server 40 using the input user ID and the password. When "OK" 463 is selected, a screen 470 is displayed.

The screen 470 is a talk room setting screen. When "channel" 471 is selected, a channel screen 480 is displayed. When "individual" 472 is selected, a screen 490 is displayed.

When "logged-in user" 473 is selected, a notification can be sent to the user whose user ID and password have been input via the screen 460. The notification can be sent to the user's room, or a push notification can be sent to a user terminal of the user separately from the notification sent to the room.

A screen 480 is a channel screen. Channels are displayed as options, to which the user, who logs in via the message application screen 460, belongs. Channel information on a channel to which the logged-in user belongs is acquired from the management server 40 by the MFP 10 using the access token. In this example, channel 1 (481) and channel 3 (482) are acquired and displayed on the screen 480. When "channel 1" 481 is selected, it becomes possible to send a notification to channel 1. When "channel 3" 482 is selected, it becomes possible to send a notification to channel 3. When "channel 1" 481 or "channel 3" 482 is selected, the screen 460 is displayed.

A screen 490 is an individual screen. On this screen, there are displayed, as options, individuals belonging to the same organization as that the user belongs to who logged-in via the message application screen 460. The individuals are acquired by acquiring user information on users belonging to the same organization as that the logged-in user belongs to from the management server 40 by the MFP 10 using the access token. In the example illustrated in FIG. 6, A (491) and B (492) are acquired as the individuals and displayed on the screen. When "A" 491 is selected, it becomes possible to send a notification to user A. When "B" 492 is selected, it becomes possible to send a notification to user B. While in the present example it is assumed that users belonging to the same organization are displayed, users can be acquired and displayed based on different information. For example, the MFP 10 can acquire, from the management server 40, user information on users who have ever chatted with the user who logged-in via the message application screen 460, and acquired user information may be displayed. When "A" 491 or "B" 492 is selected, the screen 460 is displayed.

FIG. 7 illustrates an example of transfer setting information stored in the HDD 114 of the MFP 10.

In transfer setting information 500, the transfer setting information input in FIGS. 5 and 6 is stored. An ID 501 is a management number that is assigned when new information is registered. The ID 501 uniquely identifies the stored transfer setting information. When the inputting via screens illustrated in FIGS. 5 and 6 is completed and the "register" 417 is selected, a new ID 501 is assigned to the transfer setting information 500, and the transfer setting information 500 is added.

Figure 8:
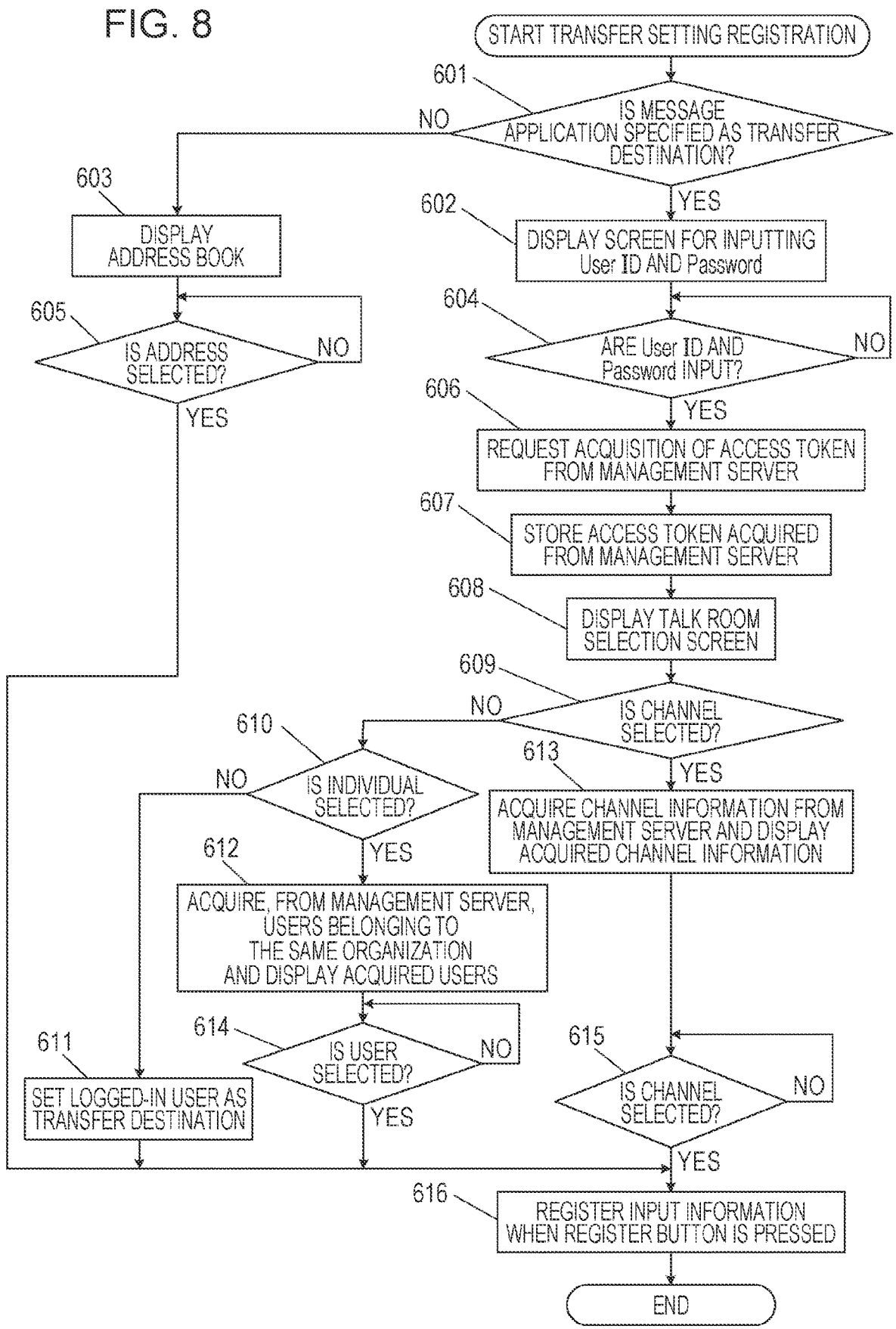
FIG. 8 is a flowchart illustrating a transfer setting registration according to a first embodiment.

FIG. 8 is a flowchart illustrating a transfer setting registration process executed by the MFP 10. Each operation (step) in the flowchart of the present embodiment is realized by the CPU 111 by loading a control program stored in the ROM 112 or HDD 114 into the RAM 113, and executing it. The process illustrated in this flowchart of FIG. 8 is started when the message application in FIG. 5 or 6 is selected.

In S601, the CPU 111 determines whether a user has selected the message application as the transfer destination. In a case where it is determined that the message application is selected, the processing flow proceeds to S602. In a case where it is determined that the address book is selected, the processing flow proceeds to S603.

In S602, the CPU 111 causes the operation unit 116 to display the message application screen 460 for inputting a user ID and a password. The processing flow then proceeds to S604.

In S603, the CPU 111 causes the operation unit 116 to display the address book. The processing flow then proceeds to S605.

In S604, the CPU 111 determines whether the user has entered a user ID and a password. In a case where it is determined that a user ID and a password have been entered, the processing flow proceeds to S606. Hereinafter, the user who has entered the user ID and the password is referred to as a "logged-in user".

In S605, the CPU 111 determines whether the logged-in user has selected an address. When an address is selected, the processing flow proceeds to S616.

In S606, the CPU 111 requests the management server 40 to provide an access token based on the user ID and the password input in S604.

In S607, the CPU 111 stores the access token acquired from the management server 40 in the HDD 114.

In S608, CPU 111 causes the operation unit 116 to display the talk room selection screen 470.

In S609, the CPU 111 determines whether the logged-in user has selected a channel. In a case where a channel is selected, the CPU 111 causes the processing flow to proceed to S613. In a case where something other than the channel is selected, the processing flow proceeds to S610.

In S610, the CPU 111 determines whether the logged-in user has selected "individual". In a case where "individual" is selected, the processing flow proceeds to S612. In a case where "logged-in user" is selected, the processing flow proceeds to S611.

In S611, the CPU 111 sets the logged-in user as the transfer destination. The processing flow then proceeds to S616.

In S612, the CPU 111 acquires user information on users belonging to the same organization as that the logged-in user belongs to from the management server 40 using the access token. The individual screen 490 including the acquired user information (for example, user names) is displayed on the operation unit 116. The processing flow then proceeds to S614. As described above with reference to the screen 490, users displayed here are not limited to those belonging to the same organization as the logged-in user belongs to, but users can be acquired and displayed based on different information.

In S614, the CPU 111 determines whether the logged-in user has selected a transfer destination user.

In a case where it is determined that a transfer destination user is selected, the selected user is set as the transfer destination. The processing flow then proceeds to S616.

In a case where the processing flow proceeds to S613 from S609, in S613, the CPU 111 acquires, from the management server 40 using the access token, channel information on a channel to which the logged-in user belongs. The CPU 111 causes the operation unit 116 to display the channel screen 480 including the acquired channel name. The processing flow then proceeds to S615.

In S615, the CPU 111 determines whether the logged-in user has selected a channel. In a case where it is determined that a channel is selected, the selected channel is set as the transfer destination. The processing flow then proceeds to S616.

Here, the setting of the notification destination is performed via the same processes from S601 to S615.

In S616, when the register button 416 is selected, the CPU 111 registers the setting information in the HDD 114 and then ends the process.

Figure 9:
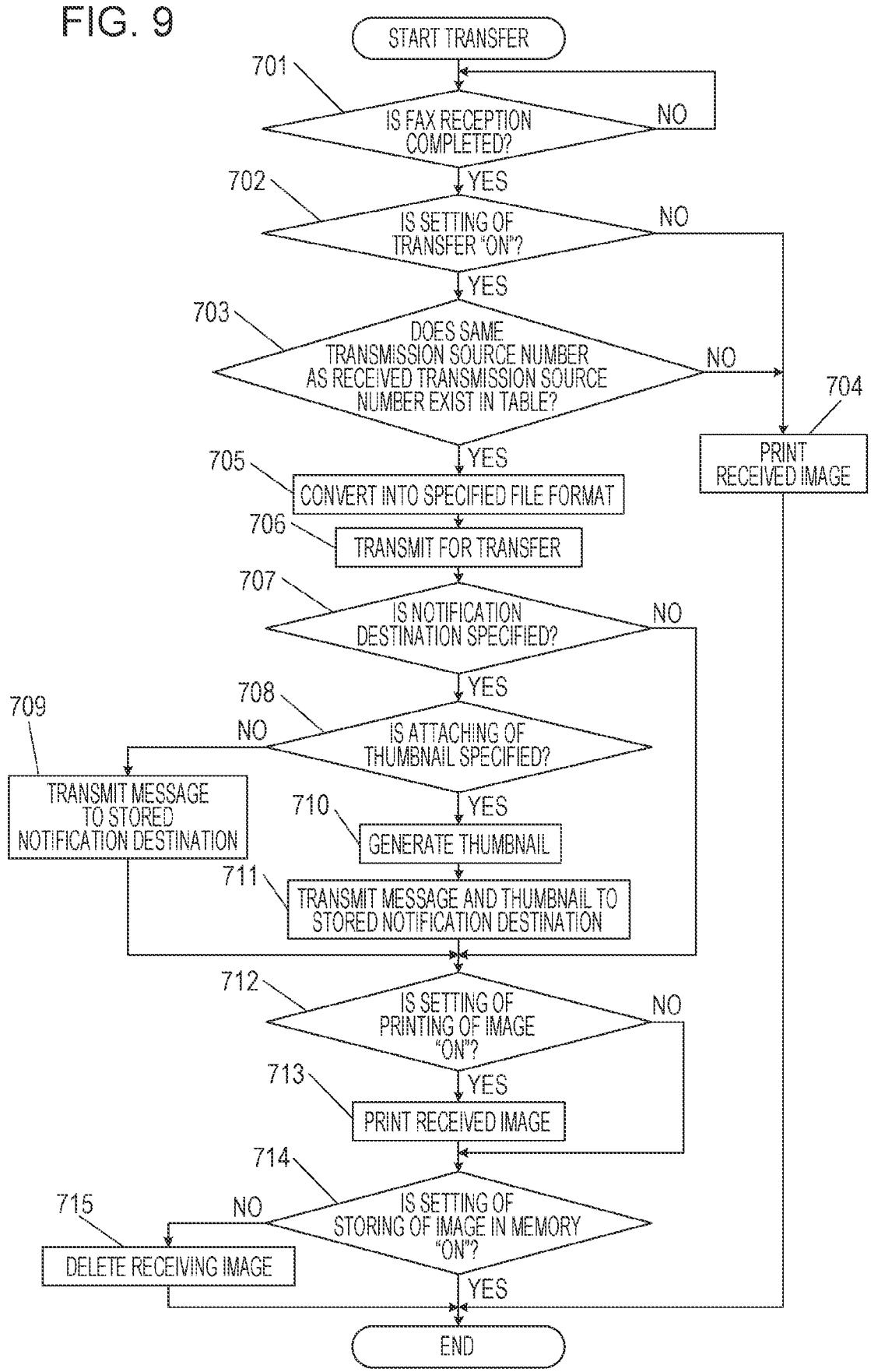
FIG. 9 is a flowchart illustrating a transfer process according to the first embodiment.

FIG. 9 is a flowchart illustrating a transfer process executed by the MFP 10. Each operation (step) in this flowchart of the present embodiment is realized by the CPU 111 by loading a facsimile application program stored in the ROM 112 or HDD 114 into the RAM 113, and executing it. The processing illustrated in the flowchart of FIG. 9 is started when the MFP 10 starts receiving FAX image data. The received image data is stored in the HDD 114 by the CPU 111.

In S701, the CPU 111 determines whether a FAX reception from the public line network 80 is completed. In a case where it is determined that the FAX reception is completed, the process proceeds to S702. As part of the determination a telephone number of a transmission source of the FAX is received, and the CPU 111 stores this telephone number in the RAM 113.

In S702, the CPU 111 determines whether the transfer setting is ON. In a case where ON is selected for "using of transferring function" 411, it is determined that the transfer setting is ON. In a case where OFF is selected for "using of transferring function" 411, it is determined that the transfer setting is OFF. When it is determined that the transfer setting is ON, the processing flow proceeds to S703. When it is determined that the transfer setting is OFF, the processing proceeds to S704.

In S703, the CPU 111 identifies the received transmission source number sent from the transmission source when the FAX is received, and determines whether the same transmission source number as the identified transmission source number exists in the transfer destination information 500 illustrated in FIG. 7. In a case where it is determined that the same transmission source number exists, the CPU 111 causes the processing flow to proceed to S705. In a case where it is determined that the same transmission source number does not exist, the CPU 111 causes the processing flow to proceed to S704.

In S704, the CPU 111 causes the printing unit 120 to print the received FAX image, and ends the processing illustrated in FIG. 9.

In S705, the CPU 111 converts the received FAX image into the specified file format. The processing flow then proceeds to S706.

In S706, based on the transfer destination information 500 illustrated in FIG. 7, the CPU 111 causes the communication unit 126 to transfer the image data obtained in S705 as a result of the conversion to the transfer destination stored in association with the transmission source number identified in S703. The processing flow then proceeds to S707.

In S707, the CPU 111 determines, based on the transfer destination information 500 illustrated in FIG. 7, whether a notification destination is set in the transfer setting including the transmission source number identified in S705. In a case where a notification destination setting is set, the CPU 111 causes the processing flow to proceed to S708. In a case where a notification destination setting is not set, the CPU 111 causes the processing flow to proceed to S712.

In S708, the CPU 111 determines whether the thumbnail attachment is specified in the transfer setting including the transmission source number identified in S705. In a case where the thumbnail attachment is specified, the CPU 111 causes the processing flow to proceed to S710. In a case where the thumbnail attachment is not specified, the CPU 111 causes the processing flow to proceed to S709.

In S709, the CPU 111 causes the communication unit 126 to transmit a message to the notification destination included in the transfer setting including the transmission source number identified in S705. The processing flow then proceeds to S712.

In S710, the CPU 111 generates a thumbnail image by converting the first page of the received image into a JPEG image. In this example, the thumbnail image is obtained by converting the first page into the JPEG image. However, thumbnail image can be obtained via any other conversion method. For example, the thumbnail image can be generated by converting a plurality of pages into TIFF files.

In S711, the CPU 111 identifies the notification destination included in the transfer setting including the transmission source number identified in S705. The CPU 111 also causes the communication unit 126 to transmit a message and the thumbnail image to the identified notification destination. The processing flow then proceeds to S712. The transmitted message indicates that a FAX has been received.

In S712, the CPU 111 determines whether the image setting is ON. In a case where it is determined the image setting is ON, the CPU 111 causes the processing flow to proceed to S713. In a case where it is determined the image setting is OFF, the CPU 111 causes the processing flow to proceed to S714.

In S713, the CPU 111 causes the printing unit 120 to print the received image. The processing flow then proceeds to S714.

In S714, the CPU 111 checks the setting of "storing image in memory" 403 and determine whether it is specified to keep the image data in the memory. In a case where it is determined that it is specified to keep the image data in the memory, the CPU 111 ends the processing of the flowchart illustrated in FIG. 9 without deleting the received image data. In a case where it is determined that it is not specified to keep the image data in the memory, the CPU 111 causes the processing flow to proceed to S715.

In S715, the CPU 111 deletes the received image data from the HDD 114, and then ends the processing of the flowchart illustrated in FIG. 9.

When transmission is performed in S709 or S711, if channel 1 is specified as the notification destination as with ID2 in FIG. 7, users belonging to a talk room of channel 1 can display the contents of the notification by opening the talk room. However, this notification is not sent to, for example, channel 3, and thus users who do not belong to channel 1 do not receive this notification. When user A is specified as the notification destination as with ID3 in FIG. 7, user A can display the contents of the notification by opening the notification section dedicated to user A. However, for example, user B does not receive this notification. That is, it is possible to prevent the frequency of notification from becoming unnecessarily high that would occur if a large number of notifications were sent to all users or all channels instead of sending a limited number of notifications only to specified users or channels.

Figure 10:
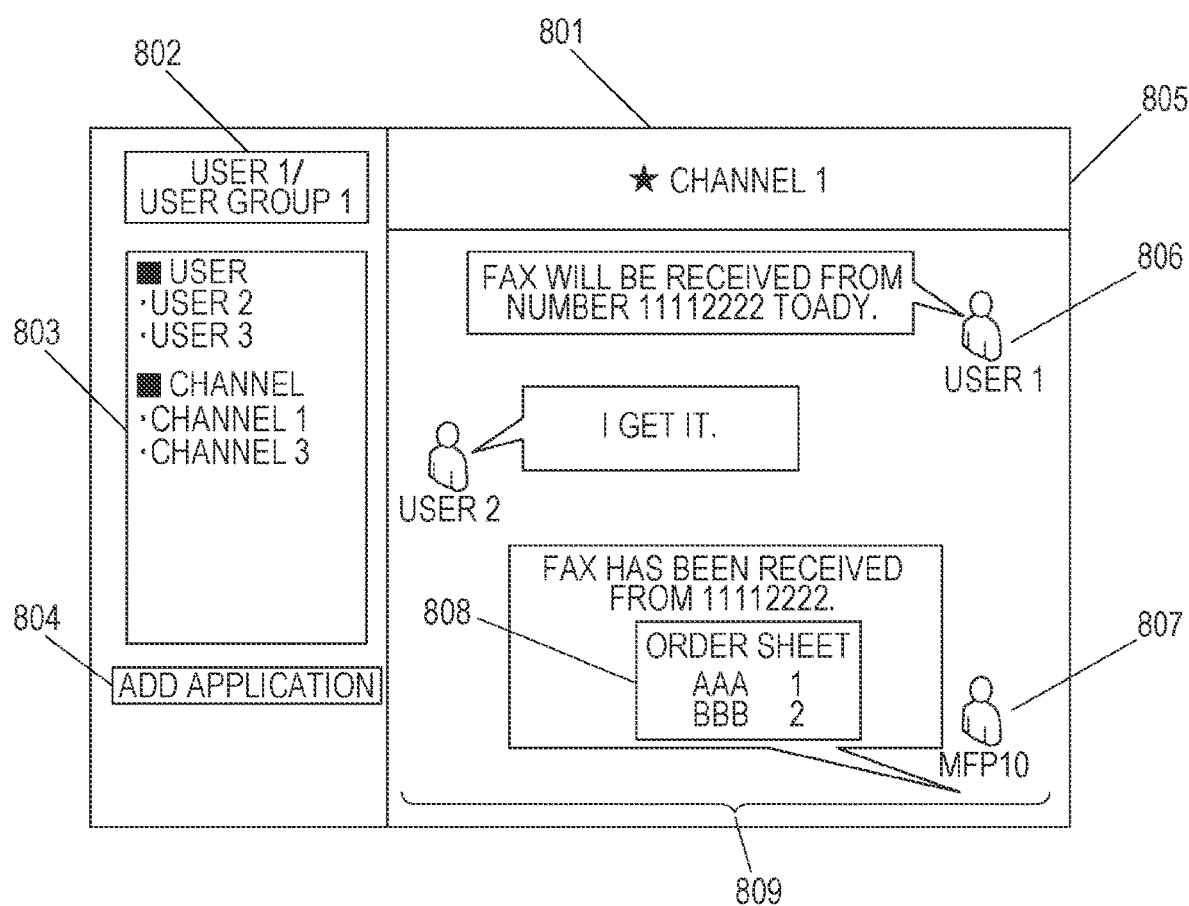
FIG. 10 is a diagram illustrating a message application screen displayed on a user terminal according to an embodiment.

FIG. 10 is a diagram illustrating a screen that is displayed on the touch panel 201 of the user terminal 20 such that screen data of the screen is generated by the message application 306 of the application server 30 and received by the user terminal 20 and displayed on the touch panel 201 of the user terminal 20. In the user terminal 20, a user ID and a password (same as the user ID and the password registered via the screen 460) for the user to log in to the application server 30 are registered in advance by the user. When the user performs an operation to open the message application using the user terminal 20, the user terminal 20 transmits the registered user ID and password to the application server 30. When the application server 30 receives the user ID and the password transmitted from the user terminal 20, the application server 30 performs user authentication based on the received user ID and password. The application server 30 then transmits screen data of the message application 306 for use by the authenticated user to the user terminal 20. In response, the user terminal 20 displays the screen illustrated in FIG. 10.

In FIG. 10, message screen 801 is displayed on the touch panel 201 of the user terminal 20.

User Information 802 provides information of the user who operates the user terminal 20 and group information of a group to which the user belongs. These pieces of information are also registered, in association with the authenticated user, in the application server 30 that has authenticated the user, and the application server 30 transmits these pieces of information to the user terminal 20.

User information/Channel Information 803 provides user information registered by the user and channel information on channels to which the user belongs. This channel information is also registered, in association with the authenticated user, in the application server 30 that has authenticated the user, and the application server 30 transmits this channel information to the user terminal 20. By selecting an arbitrary partner from the User Information/Channel Information 803, the user can exchange messages with the selected partner. In a case where channel information (talk room information) is selected here, it is possible to exchange messages with all members belonging to the channel (talk room).

Add Application button 804 enables adding a cooperative application. When Add Application button 804 is selected, the cooperative application is installed.

Selected Channel 805 displays a history of messages with partners registered in the channel selected from User information/Channel Information 803 by the user. The messages are sequentially displayed in Selected Channel 805 in temporal order. The newer the message is, the lower the position in Selected Channel 805 where the message is displayed.

In Message Area 809, the history of messages transmitted by the user displayed in User Information 802 is displayed. The messages can contain only characters, such as the comment 806 of the user 1, or can additionally contain attached file information.

Notification Message 807 is a notification message sent from the MFP 10. When the thumbnail setting is ON, image 808 for example, and a notification message are displayed. When the thumbnail setting is OFF, only a notification message is displayed. In this example, a message "FAX has been received from 11112222" indicate that the FAX has been received is displayed. The message is not limited to this example. In another exemplary embodiment, for example, the application server 30 can receive, from the MFP 10, a message indicating that FAX has been transferred and can send a notification thereof, or can receive, from the MFP 10, a transfer destination to which the FAX has been transferred, and can send a notification thereof. The application server 30 can receive both the message indicating that FAX has been transferred and the transfer destination to which the FAX has been transferred from the MFP 10, and can send a notification thereof.

As described above, according to the present embodiment, it is possible to notify, via a chat service, a specific user of the reception of image data. An individual or a talk room to which a plurality of users belong to can be specified as a notification destination to which a notification is sent via the chart service.

A second embodiment of the present disclosure will now be described.

In the above-described first embodiment, by registering the transfer setting in the MFP 10, it becomes possible to send a FAX reception notification to only limited specific users who need the notification.

The present embodiment discusses an example where a notification setting is performed by a message application, and a notification is only sent to limited specific users who need the notification.

For any aspects of the system configuration and hardware configuration of the present embodiment that are similar to those of the first embodiment, detailed descriptions thereof are omitted.

Figure 11A:
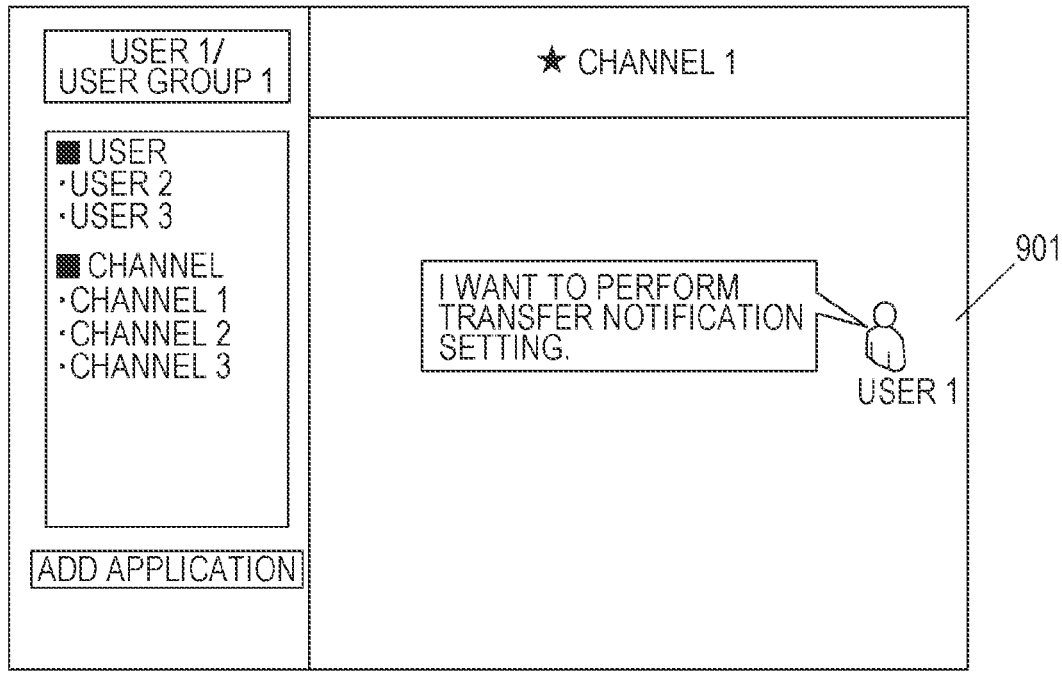
FIG. 11A and FIG. 11B are diagrams illustrating an example of a transfer application setting displayed on a message application according to a second embodiment.
Figure 11B:
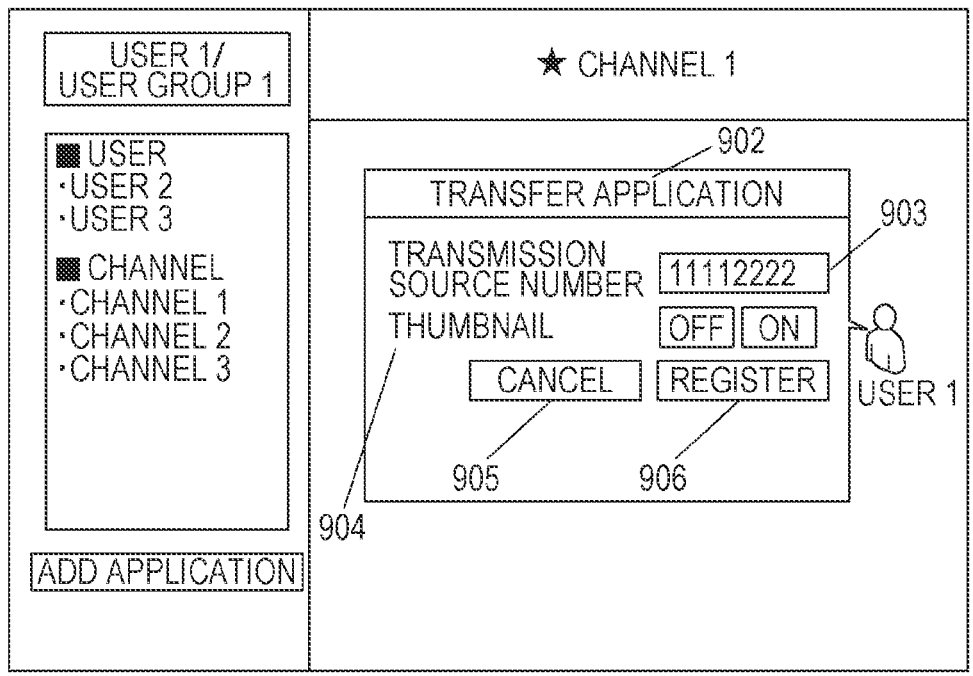

FIG. 11A and FIG. 11B are diagrams illustrating a screen that is displayed on the touch panel 201 of the user terminal 20 such that screen data of the screen is generated by the message application 306 and received by the user terminal 20 and displayed on the touch panel 201 of the user terminal 20. This can be realized in the present embodiment by selecting the Add Application button 804 for adding a cooperative application, thereby additionally installing a FAX transfer chatbot application 307 in the application server 30.

In FIG. 11A, FAX Transfer Application screen 901 is where a message can be input by a user by operating the touch panel 201 of the user terminal 20 to activate the cooperative application. A sentence "I want to perform transfer notification setting" triggers the activation of the FAX transfer chatbot application, and the FAX Transfer Application screen 902 illustrated in FIG. 11B is displayed. In this example, the activating of the FAX transfer chatbot application is triggered by the sentence "I want to perform transfer notification setting". However, this is not seen to be limiting, and activation of the FAX transfer chatbot application can be triggered by any phrase or sentence that would enable practice of the present embodiment. In another exemplary embodiment, instead of activating the FAX transfer chatbot application in response to a phrase or a sentence, a user can select and activate the FAX transfer chatbot application.

Turning to FIG. 11B, FAX transfer application screen 902 enables a user to make settings related to the transfer notification.

Transmission Source Number 903 enables a user to input a transmission source number from which a notification it to be sent.

Thumbnail 904 enables setting whether a thumbnail is to be transmitted.

Cancel button 905 enables exiting without registering the settings.

Register button 906 enables registering the settings. When the Register button 906 is selected, the setting information is stored in the HDD 305 of the application server 30. More specifically, the transmission source number set in Transmission Source Number 903, the notification destination of channel 1 opened on the user terminal 20 by the user, and the ON/OFF-setting of the thumbnail set in Thumbnail 904 are associated with each other and stored as the notification setting in the HDD 305. When this notification setting is newly registered, an ID for uniquely identifying the notification setting is assigned.

FIG. 12 is a sequence diagram illustrating FAX transfer processing performed by the application server 30 and the MFP 10 according to the present embodiment.

In S1001, a user inputs a message "I want to perform transfer notification setting" to the application server 30 by operating the user terminal 20.

In S1002, the application server 30 transmits a device information acquisition request to the management server 40. The management server 40 manages device information of devices such as the MFP 10, the MFP 11, and the like, and transmits device information to the application server 30 in response to an acquisition request from the application server 30.

In S1003, the management server 40 transmits device information. In a case where a plurality of pieces of device information are registered, the user can set for which device the setting is performed.

In S1004, the application server 30 transmits screen data to the user terminal 20. The user terminal 20 displays the FAX Transfer Application screen 901 based on the received screen data.

In S1005, the user sets the Transmission Source Number 903 and the Thumbnail 904, and selects the Register button 906. When the Register button 906 is selected, the application server 30 stores the setting information in the HDD 305.

In S1006, the MFP 10 performs a FAX reception. In the MFP 10, the transmission source number, the transfer destination, the file name, the file format, and the thumbnail ON/OFF-setting illustrated in FIG. 7 are stored in advance, along with the ID, in association with each other. The MFP 10 transfers the image data to the transfer destination stored in association with the transmission source number that matches the transmission source number notified when the FAX image data is received.

In S1007, the MFP 10 transmits the image data received by FAX and the transmission source number to the application server 30.

In S1008, the application server 30 determines whether there is a transmission source number matching the transmission source number received from the MFP 10 from among the transmission source numbers in the transfer setting information registered in the HDD 305. In a case where it is determined in S1008 that there is matched registration information, the application server 30 writes a notification that the FAX has been received in the talk room registered in association with the transmission source number and stores the information indicating this event.

In S1009, when the user accesses the talk room from the user terminal 20, the written notification is displayed.

In a case where the thumbnail setting is ON, the application server 30 converts the received image data into a JPEG image and sends it together with the message.

According to the above-described embodiment, the notification setting can be made by operating the user terminal 20. Making the notification setting enables sending a notification to only limited specific users who need the notification.

A third embodiment of the present disclosure will now be described.

The first embodiment was described above by way of example for a case where the transfer setting is performed by the MFP 10 such that a FAX reception notification is only sent to limited specific users who need the notification.

FIG. 13 illustrates a flowchart of the present exemplary embodiment of a process that is performed when the transfer setting does not include the transmission source number that matches the transmission source number of the received FAX image.

Processes S1101 to S1115 in FIG. 13 are the same as processes 701 to 715 in FIG. 9. As such, their descriptions are omitted herein.

In S1116, the CPU 111 sends, using the communication unit 126, a reception notification to a talk room of a shared channel registered in the MFP 10. The processing flow then proceeds to S1104. The shared channel refers to a channel registered via a setting registration screen (not illustrated) as a channel to which all users belong and also as a notification destination to which information notification is sent from the MFP 10. When a shared channel is specified as the notification destination, a hashtag can be added to make it possible to easily find the notification. The notification destination can be a notification destination registered in administrator information. Print data can be stored in the MFP 10 without issuing a notification and without executing printing.

As described above, according to the present embodiment, even when a transmission source number of a received FAX is not found in the transfer setting, a user can receive a notification of the reception of the FAX.

OTHER EMBODIMENTS

In the above-described embodiments, by way of example, when the FAX transfer function for transferring received image data is executed, a notification is sent to notify that there is image data received by FAX. In another exemplary embodiment, when a FAX reception function is executed where image data received by FAX is stored in the HDD 114 of the MFP 10 and maintained there until an instruction is issued by a user via the operation unit 116, a notification can be sent to notify that there is image data received FAX. In this case, the image data stored in the HDD 114 is printed when a print instruction issued by the user via the operation unit 116 is accepted. In a case where a display instruction issued by the user via the operation unit 116 is accepted, the image data stored in the HDD 114 is displayed on the operation unit 116. In a case where a transmission destination and a transmission instruction input by the user via the operation unit 116 are accepted, the image data stored in the HDD 114 is transmitted to the transmission destination. These instructions can be received from an external PC or the user terminal 20 via the network 70.

In the above-described embodiments image data is received by FAX. In another exemplary embodiment image data can be received by e-mail. In this case, the information indicating the transmission source can be an e-mail address of the transmission source instead of the telephone number. The MFP 10 determines whether an e-mail address that matches the e-mail address of the transmission source described following "From" in the received e-mail is set in advance in the transfer settings of the MFP 10. In a case where the MFP 10 determines that the e-mail address is set, the MFP 10 transfers the image data to the transfer destination stored in association with the e-mail address. The MFP 10, using this notification method, can notify the user that the e-mail has been received.

In the above-described embodiments a notification is issued to notify that a FAX has been received. In addition to such a notification, information (a file path or Uniform Resource Locator (URL)) for accessing image data transferred by the MFP 10 to the transfer destination can be notified.

In the first and third embodiments, in a case where a file path of the file server is set as the transfer destination in the transfer settings, the MFP 10 notifies the application server 30 of the file path. This enables the user operating the user terminal 20 to easily access and refer to the image data in the transfer destination by selecting the information.

The present disclosure can also be realized by supplying a program for realizing one or more functions of the one or more above-described embodiments to a system or an apparatus via a network or a storage medium, and reading and executing the program by one or more processors of a computer in the system or the apparatus. The present disclosure can also be realized by a circuit (for example, ASIC) configured to realize the one or more functions.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2021-182335 filed Nov. 9, 2021, which is hereby incorporated by reference herein in its entirety.

What is claimed is:

1. An image processing apparatus that communicates with a chat service, the image processing apparatus comprising:
an operation panel; and
a processor that causes the image processing apparatus to:
receive information from the chat service;
display, based on the received information, rooms in the chat service;
store, in association with transmission source information indicating a transmission source registered on the operation panel, room information indicating a room selected via the operation panel from among the displayed rooms; and
notify, based on reception of image data by the image processing apparatus, the room indicated by the room information stored in association with the transmission source information indicating the transmission source of the image data of the reception of the image data,
wherein the reception of the image data by the image processing apparatus is reception of the image data by a facsimile.

2. The image processing apparatus according to claim 1, wherein the room in the chat service is selected via the operation panel for each transmission source.

3. The image processing apparatus according to claim 1, wherein the information received from the chat service is information on the room.

4. The image processing apparatus according to claim 1, wherein the processor further causes the image processing apparatus to transmit a thumbnail of the received image data to the room.

5. The image processing apparatus according to claim 1, wherein transmission destination information indicating a transmission destination is further stored in association with the transmission source information, and
wherein the processor further causes the image processing apparatus to transfer the received image data to the transmission destination indicated by the transmission destination information.

6. The image processing apparatus according to claim 1, wherein the processor further causes the image processing apparatus to select, as the room, a channel or a personal room,
wherein, in a case where the channel is selected as the room, channel information indicating the channel selected via the operation panel is stored in association with the transmission source information, and
wherein, in a case where the personal room is selected as the room, personal room information indicating the personal room selected via the operation panel is stored in association with the transmission source information.

7. The image processing apparatus according to claim 1, further comprising a printer.

8. The image processing apparatus according to claim 1, wherein the processor further causes the image processing apparatus to notify, in a case where another image data is received and room information is not stored in association with the transmission source information indicating the transmission source of the another image data, a shared channel of the reception of the another image data.

9. A method of controlling an image processing apparatus that comprises an operation panel and that communicates with a chat service, the method comprising:

receiving information from the chat service;

displaying, based on the received information, rooms in the chat service;

storing in association with transmission source information indicating a transmission source registered on the operation panel, room information indicating a room selected via the operation panel from among the displayed rooms; and notifying, based on reception of image data by the image processing apparatus, the room indicated by the room information stored in association with the transmission source information indicating the transmission source of the image data of the reception of the image data, wherein the reception of the image data by the image processing apparatus is reception of the image data by a facsimile.

10. The method of controlling the image processing apparatus according to claim 9, wherein the room in the chat service is selected via the operation panel for each transmission source.

11. The method of controlling the image processing apparatus according to claim 9, wherein the information received from the chat service is information on the room.

12. The method of controlling the image processing apparatus according to claim 9, further comprising transmitting a thumbnail of the received image data to the room.

13. The method of controlling the image processing apparatus according to claim 9, wherein transmission destination information indicating a transmission destination is further stored in association with the transmission source information, and the received image data is transferred to the transmission destination indicated by the transmission destination information.

14. The method of controlling the image processing apparatus according to claim 9, wherein a channel or a personal room is selected as the room, wherein, in a case where the channel is selected as the room, channel information indicating the channel selected via the operation panel is stored in association with the transmission source information, and wherein, in a case where the personal room is selected as the room, personal room information indicating the personal room selected via the operation panel is stored in association with the transmission source information.

15. The method of controlling the image processing apparatus according to claim 9, further comprising performing printing.

16. A non-transitory computer-readable storage medium storing a program that when executed by an image processing apparatus that comprises an operation panel and that communicates with a chat service, causes the image processing apparatus to:

receive information from the chat service;

display, based on the received information, rooms in the chat service;

storing, in association with transmission source information indicating a transmission source registered on the operation panel, room information indicating the room selected via the operation panel from among the displayed rooms; and notify, based on reception of image data by the image processing apparatus, the room indicated by the room information stored in association with the transmission source information indicating the transmission source of the image data of the reception of the image data, wherein the reception of the image data by the image processing apparatus is reception of the image data by a facsimile.

* * * * *